(12) United States Patent
Risan et al.

(10) Patent No.: US 7,578,002 B2
(45) Date of Patent: *Aug. 18, 2009

(54) CONTROLLING INTERACTION OF DELIVERABLE ELECTRONIC MEDIA

(75) Inventors: Hank Risan, Santa Cruz, CA (US); Edward Vincent Fitzgerald, Santa Cruz, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 591 days.

This patent is subject to a terminal disclaimer.

(21) Appl. No.: 10/304,390

(22) Filed: Nov. 25, 2002

(65) Prior Publication Data

US 2004/0103297 A1  May 27, 2004

(51) Int. Cl.
*H03M 1/66* (2006.01)
(52) U.S. Cl. .................................................. 726/32
(58) Field of Classification Search .................. None
See application file for complete search history.

(56) References Cited

U.S. PATENT DOCUMENTS

| 6,385,596 | B1 * | 5/2002 | Wiser et al. ............. 705/51 |
| 6,772,340 | B1 * | 8/2004 | Peinado et al. .......... 713/168 |
| 6,802,003 | B1 * | 10/2004 | Gross et al. ............. 713/175 |
| 7,069,590 | B1 * | 6/2006 | Malvar et al. ............ 726/26 |
| 7,231,042 | B2 * | 6/2007 | Kori et al. ............... 380/201 |
| 7,328,455 | B2 * | 2/2008 | Jutzi et al. ............... 726/26 |
| 7,366,908 | B2 * | 4/2008 | Tewfik ................... 713/176 |
| 2002/0006204 | A1 * | 1/2002 | England et al. .......... 380/269 |
| 2002/0196941 | A1 * | 12/2002 | Isaacson et al. ......... 380/231 |
| 2004/0039911 | A1 | 2/2004 | Oka et al. |

FOREIGN PATENT DOCUMENTS

WO  WO-0146952  6/2001

OTHER PUBLICATIONS

"California Software Labs Multi Monitor Display and Video Mini Port Driver Development", http://www.cswl.com/whitepapers/multi-monitor-display.html, (Oct. 2005),1-9.

* cited by examiner

*Primary Examiner*—Matthew B Smithers
*Assistant Examiner*—David J Pearson

(57) ABSTRACT

A method of restricting client interaction of deliverable electronic media. In one embodiment, the method is comprised of detecting a media player application operable within a computer system. The media player application enables the computer system to present contents of a media file. The present method is further comprised of governing within said media player application a function that enables non-compliance with a usage restriction applicable to the media file. The present method is further comprised of controlling output of the media file. The controlling is performed by a compliance mechanism coupled to the computer system. The compliance mechanism is for enabling compliance with the usage restriction applicable to the media file.

32 Claims, 8 Drawing Sheets

CONTROLLING INTERACTION OF DELIVERABLE ELECTRONIC MEDIA

CROSS REFERENCE TO RELATED APPLICATIONS

This application is cross referenced with co-pending U.S. patent application Ser. No. 10/235,293, entitled "SYSTEM AND METHOD FOR PROVIDING GLOBAL MEDIA CONTENT DELIVERY" by Hank Risan, et al., filed Sep. 4, 2002, assigned to the assignee of the present invention, and which is hereby incorporated by reference.

FIELD OF THE INVENTION

The present invention relates to electronic media. More particularly, the present invention relates to restricting interaction of delivered electronic media.

BACKGROUND OF THE INVENTION

With advancements in hardware and software technology, computers are integral tools utilized in various applications, such as finance, CAD (computer aided design), manufacturing, health care, telecommunication, education, etc. Further, an enhancement in computer functionality can be realized by communicatively coupling computers together to form a network. Within a network environment, computer systems enable users to exchange files, share information stored in common databases, combine or pool resources, communicate via electronic mail (e-mail), and access information on the Internet. Additionally, computers connected to a network environment, e.g., the Internet, provide their users access to data and information from all over the world.

Some of the various types of data that a user can access and share include, but are not limited to, text data such as that found in a word document, graphical data such as that found in pictures, e.g., JPEGs, GIFs, TIFFs, audio data such as that found in music files, e.g., MP3 files, and video data such as that found in moving pictures files, e.g., MPEG, MOV, and AVI files, to name a few. In fact, nearly any type of data can be stored and shared with other computer systems. In many instances, the material contained within the various data types is copyrighted material.

There are many different types of network environments that can be implemented to facilitate sharing of data between computer systems. Some of the various network environment types include Ethernet, client-server, and wired and/or wireless network environments. A common utilization of a network environment type is for file sharing, such as in a P2P network or point-to-point network. Most P2P networks rely on business models based upon the transfer and redistribution of copyrighted material, e.g., audio files, between computers coupled to a network, e.g., the Internet. A P2P network allows a user to acquire the copyrighted material from a computer, a web site source, or a music broadcaster, and store and share the material with other users throughout the network, in some instances acting as a web site source or a music broadcaster.

It is also common for users sharing files in an uncontrolled manner to use freely distributed or commercially available media player applications to experience, e.g., listen, view, and/or watch, the shared files. In many instances, these media player applications also provide for downloading the media file from a P2P network or from licensed web broadcasters, saving it locally, and then upload the media file onto an unlawful P2P or similar network and/or consumer recording devices. Unlawfully saving a media file can be as simple as selecting the save or record function on a media player application.

Additionally, many of the computers, web sites, and web broadcasters that share copyrighted material commonly do not control or monitor the files being exchanged between computers. Additionally, when web sites attempt to control or restrict the distribution of copyrighted material, e.g., audio files, users seeking to circumvent controls or restrictions can, in many cases, simply utilize the recording functionality of a media player application and save the copyrighted material, rename the particular audio file, and upload the renamed file, rendering attempts to control or restrict its distribution moot.

A disadvantage to the uncontrolled sharing of files, more particularly the downloading, saving, and uploading of copyrighted material, e.g., music files, is that there is currently no effective means to provide compensation to the owner (e.g., record company, lyricist, musician, etc.) of the copyrighted material. Studies have revenue losses in the billions due to unauthorized copying and inaccurate reporting of royalties.

Current methods of sharing music files do not provide adequate file distribution controls or proper accountability with regard to licensing agreements and/or copyright restrictions associated with shared copyrighted material.

SUMMARY OF THE INVENTION

Accordingly, a need exists for a method that provides control of the distribution of media content shared through a network environment, e.g., the Internet. Further, a need exists for a method that provides compliance with copyright restrictions and/or licensing agreements associated with the media content being shared. Embodiments of the present invention satisfy the above mentioned needs.

In one embodiment, the present invention provides a method of controlling interaction of deliverable electronic media that is comprised of detecting a media player application operable within a computer system. The media player application enables the computer system to present contents of a media file. The present method is further comprised of governing within the media player application a function that enables non-compliance with a usage restriction applicable to the media file. The present method is further comprised of controlling the output of the media file. The controlling is performed by a compliance mechanism coupled to the computer system. The compliance mechanism is for enabling compliance with the usage restriction applicable to the media file.

In another embodiment, the present invention provides computer implementable instructions stored on a computer readable medium, the instructions for causing a compliance mechanism to perform a method of controlling client interaction of a media file. The method is comprised of discovering a media player application operable within a client computer system. The media player application is for presenting contents of a media file deliverable to the client computer system. The present method is further comprised of regulating a function of the media player application that does not comply with usage restrictions applicable to the media file. The present method further includes controlling output of the media file. The compliance mechanism performs the controlling and also enables compliance with the usage restriction.

In another embodiment, the present invention provides a method for media file usage restriction compliance comprising means for detecting a media player application operable on a client computer system and for presenting contents of a media file. The present method further comprises means for governing a function of said media player application that does not comply with a usage restriction applicable to a media file. The present method further includes means for controlling output of the media file. A compliance mechanism coupled to the client computer system performs the restricting and also enables compliance with the usage restriction applicable to the media file.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
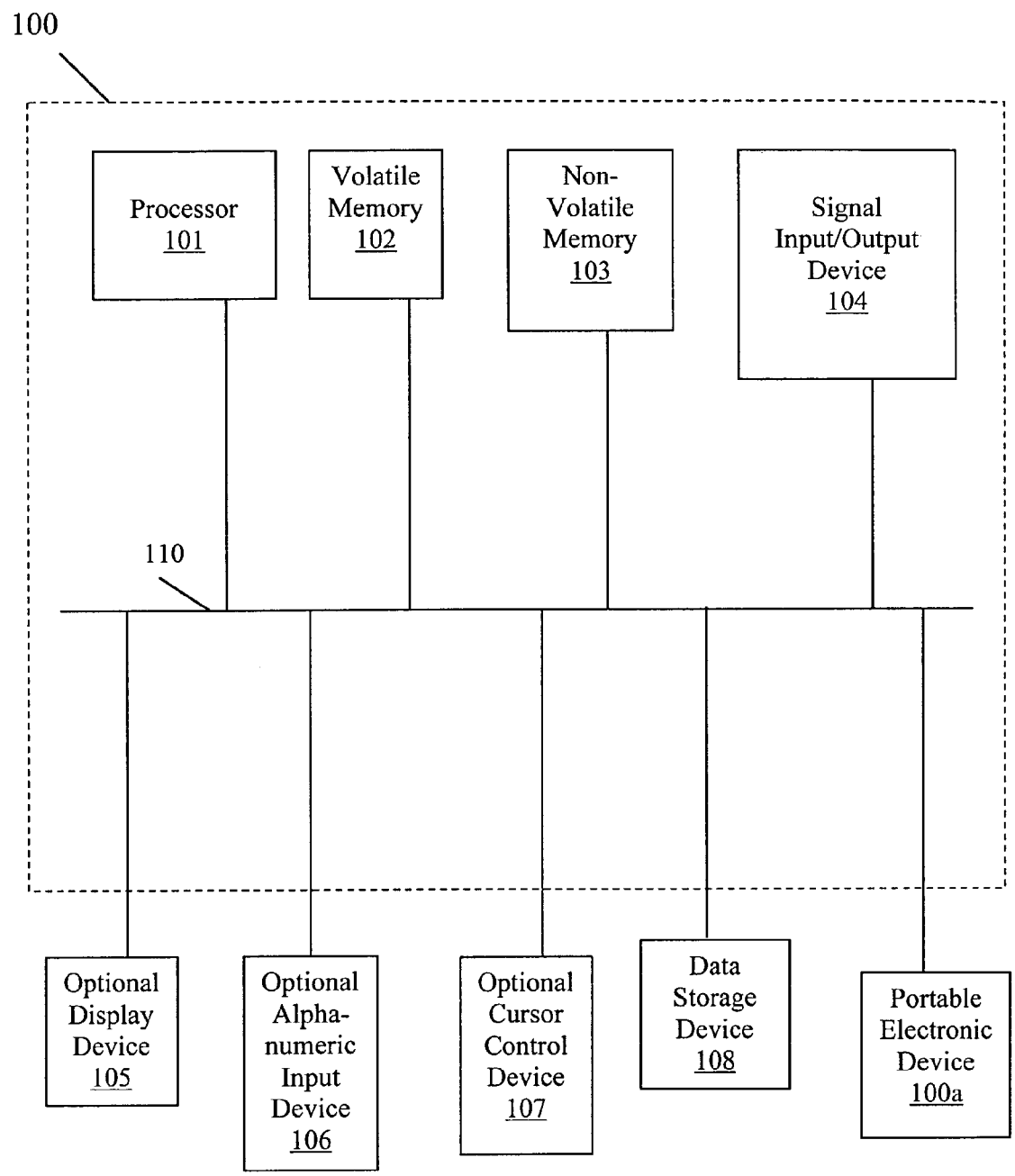
FIG. 1 is a block diagram of an exemplary computer system that can be utilized in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, to one of ordinary skill in the art, the present invention may be practiced without these specific details. In other instances, well known methods, procedures, components, and circuits have not been described in detail as not to unnecessarily obscure aspects of the present invention.

Some portions of the detailed description which follows are presented in terms of procedures, logic blocks, processing, and other symbolic representations of operations on data bits within a computing system or digital memory system. These descriptions and representations are the means used by those skilled in the data processing art to most effectively convey the substance of their work to others skilled in the art. A procedure, logic block, process, etc., is herein, and generally, conceived to be a self-consistent sequence of steps or instructions leading to a desired result. The steps are those involving physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like, with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that discussions of the present invention refer to actions and processes of a computing system, or similar electronic computing device that manipulates and transforms data. The data is represented as physical (electronic) quantities within the computing system's registers and memories and is transformed into other data similarly represented as physical quantities within the computing system's memories or registers, or other such information storage, transmission, or display devices.

In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

Embodiments of the present invention are discussed primarily in the context of a network of computer systems such as a network of desktop, workstation, laptop, handheld, and/or other portable electronic device. For purposes of the present application, the term "portable electronic device" is not intended to be limited solely to conventional handheld or portable computers.

Instead, the term "portable electronic device" is also intended to include many mobile electronic devices. Such mobile devices include, but are not limited to, portable CD players, MP3 players, mobile phones, portable recording devices, and other personal digital devices.

FIG. 1 is a block diagram illustrating an exemplary computer system 100 that can be used in accordance with an embodiment of the present invention. It is noted that computer system 100 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 100 and which are executed by a processor(s) of computer system 100, in one embodiment. When executed, the instructions cause computer system 100 to perform specific actions and exhibit specific behavior which is described in detail herein.

Computer system 100 of FIG. 1 comprises an address/data bus 110 for communicating information, one or more central processors 101 coupled to bus 110 for processing information and instructions. Central processor(s) 101 can be a microprocessor or any alternative type of processor. Computer system 100 also includes a computer usable volatile memory 102, e.g., random access memory (RAM), static RAM (SRAM), dynamic RAM (DRAM), synchronous dynamic RAM (SDRAM), double data rate RAM (DDR RAM), etc., coupled to bus 110 for storing information and instructions for processor(s) 101. Computer system 100 further includes a computer usable non-volatile memory 103, e.g., read only memory (ROM), programmable ROM, electronically programmable ROM (EPROM), electrically erasable ROM (EEPROM), flash memory (a type of EEPROM), etc., coupled to bus 110 for storing static information and instructions for processor(s) 101. In one embodiment, non-volatile memory 103 can be removable.

System 100 also includes one or more signal generating and receiving devices, e.g., signal input/output device(s) 104 coupled to bus 110 for enabling computer 100 to interface with other electronic devices. Communication interface 104 can include wired and/or wireless communication functionality. For example, in one embodiment, communication interface 104 is a serial communication port, but can alternatively be one of a number of well known communication standards and protocols, e.g., a parallel port, an Ethernet adapter, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 104. In such an instance, communication interface 104 may include a DSL modem.

Computer 100 of FIG. 1 can also include one or more computer usable data storage device(s) 108 coupled to bus 110 for storing instructions and information, in one embodiment of the present invention. In one embodiment, data storage device 108 can be a magnetic storage device, e.g., a hard disk drive, a floppy disk drive, a zip drive, or other magnetic storage device. In another embodiment, data storage device 108 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 108 can be located internal and/or external of system 100 and communicatively coupled with system 100 utilizing wired and/or wireless communication technology, thereby providing expanded storage and functionality to system 100. It is further noted that nearly any portable electronic device, e.g., device 100a, can also be communicatively coupled with system 100 via utilization of wired and/or wireless technology, thereby expanding the functionality of system 100.

System 100 can also include an optional display device 105 coupled to bus 110 for displaying video, graphics, and/or alphanumeric characters. It is noted that display device 105 can be a CRT (cathode ray tube), a thin CRT (TCRT), a liquid crystal display (LCD), a plasma display, a field emission display (FED) or any other display device suitable for displaying video, graphics, and alphanumeric characters recognizable to a user.

Computer system 100 of FIG. 1 further includes an optional alphanumeric input device 106 coupled to bus 110 for communicating information and command selections to processor(s) 101, in one embodiment. Alphanumeric input device 106 is coupled to bus 110 and includes alphanumeric and function keys. Also included in computer 100 is an optional cursor control device 107 coupled to bus 110 for communicating user input information and command selections to processor(s) 101. Cursor control device 107 can be implemented using a number of well known devices such as a mouse, a trackball, a track pad, a joy stick, a optical tracking device, a touch screen, etc. It is noted that a cursor can be directed and/or activated via input from alphanumeric input device 106 using special keys and key sequence commands. It is further noted that directing and/or activating the cursor can be accomplished by alternative means, e.g., voice activated commands, provided computer system 100 is configured with such functionality.

Figure 2:
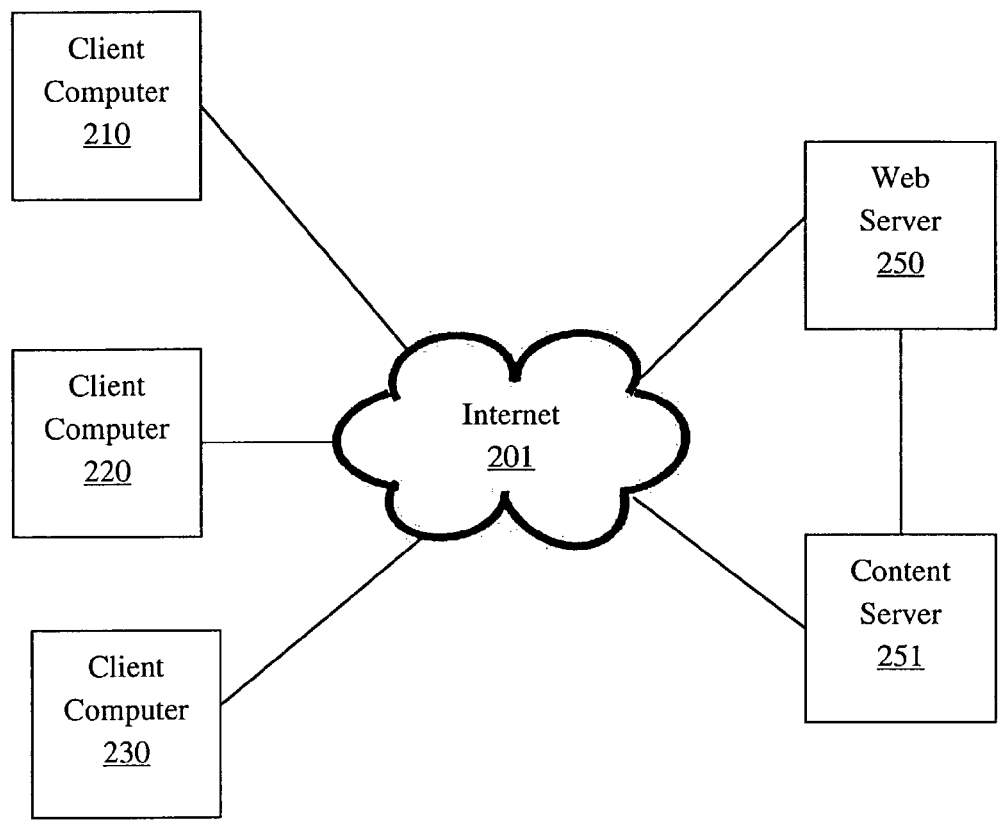
FIG. 2 is a block diagram of an exemplary network environment that can be utilized in accordance with an embodiment of the present invention.

FIG. 2 is a block diagram of an exemplary network 200 in which embodiments of the present invention may be implemented. In one example, network 200 enables one or more authorized client computer systems (e.g., 210, 220, and 230), each of which are coupled to Internet 201, to receive media content from a media content server, e.g., 251, via the Internet 201 while preventing unauthorized client computer systems from accessing media stored in a database of content server 251.

Network 200 includes a web server 250 and a content server 251 which are communicatively coupled to Internet 201. Further, web server 250 and content server 251 can be communicatively coupled without utilizing Internet 201, as shown. Web server 250, content server 251, and client computers 210, 220, and 230 can communicate with each other. It is noted that computers and servers of network 200 are well suited to be communicatively coupled in various implementations. For example, web server 250, content server 251, and client computer systems 210, 220, and 230 of network 200 can be communicatively coupled via wired communication technology, e.g., twisted pair cabling, fiber optics, coaxial cable, etc., or wireless communication technology, or a combination of wired and wireless communication technology.

Still referring to FIG. 2, it is noted that web server 250, content server 251, and client computer systems 210, 220 and 230 of network 200 can, in one embodiment, be each implemented in a manner similar to computer system 100 of FIG. 1. However, the server and computer systems in network 200 are not limited to such implementation. Additionally, web server 250 and content server 251 can perform various functionalities within network 200. It is also noted that, in one embodiment, web server 250 and content server 251 can both be disposed on a single or a plurality of physical computer systems, e.g., computer system 100 of FIG. 1.

Further, it is noted that network 200 can operate with and deliver any type of media content, (e.g., audio, video, multimedia, graphics, information, data, software programs, etc.) in any format. In one example, content server 251 can provide audio and video files to client computers 210-230 via Internet 201.

Figure 3:
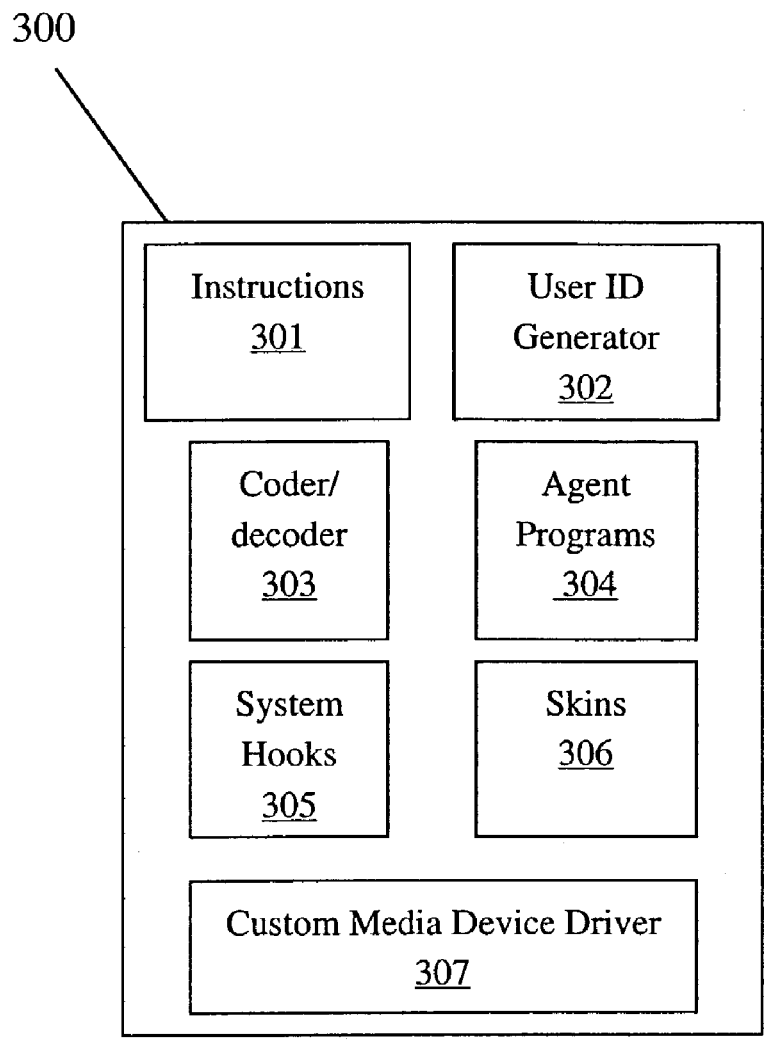
FIG. 3 is a block diagram of various exemplary functional components of a copyright compliance mechanism in accordance with an embodiment of the present invention.

FIG. 3 is a block diagram of an exemplary copyright compliance mechanism (CCM) 300, for controlling distribution of, access to, and/or copyright compliance of media files, in accordance with an embodiment of the present invention. In one embodiment, CCM 300 contains one or more software components and instructions for enabling compliance with DMCA (digital millennium copyright act) restrictions and/or RIAA (recording industry association of America) licensing agreements regarding media files.

There are currently two types of copyright licenses recognized by the DMCA for the protection of broadcasted copyrighted material. One of the broadcast copyright licenses is a compulsory license, also referred to as a statutory license. A statutory license is defined as a non-interactive license, meaning the user cannot select the song. Further, a caveat of this type of broadcast license is that a user must not be able to select a particular music file for the purpose of recording it to the user's computer system or other storage device. Another caveat of a statutory license is that a media file is not available more than once for a given period of time. In one example, the period of time can be three hours.

The other type of the broadcast license recognized by the DMCA is an interactive licensing agreement. An interactive licensing agreement is commonly with the copyright holder, e.g., a record company, the artist, where the copyright holder grants permission for a server, e.g., web server 250 and/or content server 251 of FIG. 2 to broadcast copyrighted material. Under an interactive licensing agreement, there are a variety of ways that copyrighted material, e.g., music files, can be broadcast. For example, one manner in which music files can be broadcast is to allow the user to select and listen to a particular sound recording, but without the user enabled to make a sound recording. This is commonly referred to as an interactive with "no save" license, meaning that the end user is unable to save or store the media content file in a relatively permanent manner. Additionally, another manner in which music files can be broadcast is to allow a user to not only select and listen to a particular music file, but additionally allow the user to save that particularly music file to disc and/or burn the music file to CD, MP3 player, or other portable electronic device. This is commonly referred to as an interactive with "save" license, meaning that the end user is enabled to save, store, or burn to CD, the media content file.

It is noted that the DMCA allows for the "perfect" reproduction of the sound recording. A perfect copy of a sound recording is a one-to-one mapping of the original sound recording into a digitized form, such that the perfect copy is virtually indistinguishable and/or has no audible differences from the original recording.

In one embodiment, CCM (copyright compliance mechanism) 300 can be stored in web server 250 and/or content server 251 of network 200 and which is configured to be installed into each client computer system, e.g., 210, 220 and 230, that is enabled to access the media files stored within content server 251 and/or web server 250. Alternatively, copyright compliance mechanism 300 can be, in another embodiment, externally disposed and communicatively coupled with a client computer system, e.g., system 210. In one embodiment, portions of components, entire components and/or combinations of components of CCM 300 can be readily updated, e.g., via Internet 201, to reflect changes or developments in the DMCA, changes or developments in copyright restrictions and/or licensing agreements that pertain to any media file, changes in current media player applications and/or the development of new media player applications.

Referring to FIG. 3, in one embodiment, CCM 300 is shown to include instructions 301 for enabling client computer system 210 to interact with web server 250 and content server 251 of network 200. Instructions 301 enable client computer system 210 to interact with servers, e.g., 250 and 251 in a network, e.g., 200.

The copyright compliance mechanism 300 also includes, in one embodiment, a user ID generator 302, for generating a user ID or user key, and one or more cookie(s) which contain(s) information specific to the user and the user's computer system, e.g., 210. In one embodiment, the user ID and the cookie(s) are installed in computer system 210 prior to installation of the remaining components of the copyright compliance mechanism 300. It is noted that the presence of a valid cookie(s) and a valid user ID/user key are verified by web server 250 before the remaining components of a CCM 300 can be installed, within one embodiment of the present invention. Additionally, the user ID/user key can contain, but is not limited to, the user's name, the user's address, the user's credit card number, verified email address, and an identity (username) and password selected by the user. Furthermore, the cookie can contain, but is not limited to, information specific to the user, information regarding the user's computer system 210, e.g., types of media applications operational therewithin, a unique identifier associated with computer system 210, e.g., a MAC (machine address code) address and/or an IP address, and other information specific to the user and the computer system operated by the user. It is noted that the information regarding the client computer system, e.g., 210, the user of system 210, and an access key described herein can be collectively referred to as authorization data.

Advantageously, with information regarding the user and the user's computer system, e.g., 210, web server 250 can determine when a user of one computer system, e.g., 210, has given their username and password to another user using another computer system, e.g., 220. Because the username, password, and the user's computer system 210 are closely associated, web server 250 can prevent unauthorized access to copyrighted media content, in one embodiment. It is noted that if web server 250 detects unauthorized sharing of usernames and passwords, it can block the user of computer system 210, as well as other users who unlawfully obtained the username and password, from future access to copyrighted media content available through web server 250. Web server 250 can invoke blocking for any specified period of time, e.g., for a matter of minutes or hours to months, years, or longer.

Still referring to FIG. 3, copyright compliance mechanism 300 further includes one or more coder/decoders (codec) 303 that, in one embodiment, is/are adapted to perform, but is/are not limited to, encoding/decoding of media files, compressing/decompressing of media files, detecting that delivered media files are encrypted as prescribed by CCM 300. In the present embodiment, coder/decoder 303 can also extract key fields from a header attached to each media content file for, in part, verification that the file originated from a content server, e.g., 251. In the present embodiment, coder/decoder 303 can also perform a periodic and repeated check of the media file, while the media file is passed to the media player application, e.g., in a frame by frame basis or in a buffer by buffer basis, to ensure that CCM 300 rules are being enforced at any particular moment during media playback. It is noted that differing coder/decoders 303 can be utilized in conjunction with various types of copyrighted media content including, but not limited to, audio files, video files, graphical files, alphanumeric files and the like, such that any type of media content file can be protected in accordance with embodiments of the present invention.

With reference still to FIG. 3, copyright compliance mechanism 300 also includes one or more agent programs 304 which are configured to engage in dialogs and negotiate and coordinate transfer of information between a computer system, e.g., 210, 220, or 230, a server, e.g., web server 250 and/or content server 251, and/or media player applications, with or without recording functionality, that are operable within a client computer system, in one embodiment. In the present embodiment, agent program 304 can also be configured to maintain system state, verify that other components are being utilized simultaneously, to be autonomously functional without knowledge of the client, and can also present messages, e.g., error messages, media information, advertising, etc., via a display window or electronic mail. This enables detection of proper skin implementation and detection of those applications that are running. It is noted that agent programs are well known in the art and can be implemented in a variety of ways in accordance with the present embodiment.

Copyright compliance mechanism 300 also includes one or more system hooks 305, in one embodiment of the present invention. A system hook 305 is, in one embodiment, a library that is installed in a computer system, e.g., 210, and intercepts system wide events. For example, a system hook 305, in conjunction with skins 306, can govern certain properties and/or functionalities of media player applications operating within the client computer system, e.g., 210, including, but not limited to, mouse click shortcuts, keyboard shortcuts, standard system accelerators, progress bars, save functions, pause functions, rewind functions, skip track functions, forward track preview, copying to CD, copying to a portable electronic device, and the like.

It is noted that the term govern or governing, for purposes of the present invention, can refer to a disabling, deactivating, enabling, activating, etc., of a property or function. Governing can also refer to an exclusion of that function or property, such that a function or property may be operable but unable to perform in the manner originally intended. For example, during playing of a media file, the progress bar may be selected and moved from one location on the progress line to another without having an effect on the play of the media file.

It is further noted that system hook 305 compares the information for the media player application operating in client computer system, e.g., 210, with a list of "signatures" associated with known media recording applications. In one embodiment, the signature can be, but is not limited to being, a unique identifier of a media player application and which can consist of the window class of the application along with a product name string which is part of the window title for the application. Advantageously, when new media player applications are developed, their signatures can be readily added to the signature list via an update of CCM 300 described herein.

The following C++ source code is exemplary implementation of the portion of a system hook 305 for performing media player application detection, in accordance with an embodiment of the present invention.

```
int
IsRecorderPresent(TCHAR * szAppClass,
                  TCHAR *  szProdName)
{
    TCHAR  szWndText[_MAX_PATH]; /* buffer to receive
            title string for window */
    HWND   hWnd;     /* handle to target window for operation */
    int    nRetVal;  /* return value for operation */
    /* initialize variables */
    nRetVal = 0;
    if ( _tcscmp(szAppClass,_T("#32770"))
        == 0)
    {
        /* attempt to locate dialog box with specified window title */
        if ( FindWindow((TCHAR *) 32770, szProdName)
            != (HWND) 0)
        {
            /* indicate application found */
            nRetVal = 1;
        }
    }
    else
    {
        /* attempt to locate window with specified class */
        if ( (hWnd = FindWindow(szAppClass, (LPCTSTR) 0))
            != (HWND) 0)
        {
            /* attempt to retrive title string for window */
            if ( GetWindowText(hWnd,
                    szWndText,
                    _MAX_PATH)
                != 0)
            {
                /* attempt to locate product name within title string */
                if ( _tcsstr(szWndText, szProdName)
                    != (TCHAR *) 0)
                {
                    /* indicate application found */
                    nRetVal = 1;
                }
            }
        }
    }
    /* return to caller */
    return nRetVal;
}
```

It is further noted that system hook 305 can also selectively suppress waveform input/output operations to prevent recording of copyrighted media on a client computer system 210. For example, system hook 305, subsequent to detection of bundled media player applications operational in a client computer system, e.g., 210, can stop or disrupt the playing of a media content file. This can be accomplished, in one embodiment, by redirecting and/or diverting certain data pathways that are commonly used for recording, such that the utilized data pathway is governed by a copyright compliance mechanism 300. This can be performed within a driver shim for a standard Window™ waveform output device, e.g., Windows™ Media Player. Client computer system 210 is configured such that the driver shim will appear as the default waveform audio device to client level application programs. Thus, requests for processing of waveform audio input and/or output will pass through the driver shim prior to being forwarded to the actual waveform audio driver. Such waveform input/output suppression can be triggered by other components of CCM 300, e.g., agent 304, to be active when a recording operation is initiated by a client computer system, e.g., 210, during the play back of media files which are subject to the DMCA. It is noted that alternative driver shims can be implemented for nearly any waveform output device including, but not limited to, a Windows™ Media Player. It is further noted that the driver shim can be implemented for nearly any media in nearly any format including, but not limited to, audio media files and audio input and output devices.

The following C++ source code is an exemplary implementation of the portion of a system hook 305 for diverting and/or redirecting certain data pathways that are commonly used for recording of media content, in accordance with an embodiment of the present invention.

```
DWORD
_stdcall
widMessage(UINT       uDevId,
           UINT       uMsg,
           DWORD      dwUser,
           DWORD      dwParam1,
           DWORD      dwParam2)
{
    BOOL      bSkip;     /* flag indicating operation to be
                            skipped */
    HWND      hWndMon;   /* handle to main window for
                            monitor */
    DWORD     dwRetVal;  /* return value for operation */
    /* initialize variables */
    bSkip = FALSE;
    dwRetVal = (DWORD) MMSYSERR_NOTSUPPORTED;
    if(uMsg == WIDM_START)
```

```
        {
            /* attempt to locate window for monitor application */
            if ( (hWndMon = FindMonitorWindow( ))
                != (HWND)0)
            {
                /* obtain setting for driver */
                bDrvEnabled = (  SendMessage(hWndMon,
                                              uiRegMsg,
                                              0,
                                              0)
                    == 0)
                    ? FALSE:TRUE;
            }
            if(bDrvEnabled == TRUE)
            {
                /* indicate error in operation */
                dwRetVal = MMSYSERR_NOMEM;
                /* indicate operation to be skipped */
                bSkip = TRUE;
            }
        }
        if(bSkip == FALSE)
        {
            /* invoke entry point for original driver */
            dwRetVal = CallWidMessage(uDevId, uMsg, dwUser,
                dwParam1, dwParam2);
        }
        /* return to caller */
        return dwRetVal;
}
```

It is noted that when properly configured, system hook 305 can govern nearly any function or property within nearly any media player application that may be operational within a client computer system, e.g., 210-230. In one embodiment, system hook 305 is a DLL (dynamic link library) file. It is further noted that system hooks are well known in the art, and are a standard facility in a Microsoft Windows™ operating environment, and accordingly can be implemented in a variety of ways. However, it is also noted that system hook 305 can be readily adapted for implementation in alternative operating system, e.g., Apple™ operating systems, Sun Solaris™ operating systems, Linux operating systems, and nearly any other operating system.

In FIG. 3, copyright compliance mechanism 300 also includes one or more skins 306, which can be designed to be installed in a client computer system, e.g., 210-230. In one embodiment, skins 306 are utilized to assist in client side compliance with the DMCA (digital millennium copyright act) regarding copyrighted media content. Skins 306 are customizable interfaces that, in one embodiment, are displayed on a display device (e.g., 105) of computer system 210 and provide functionalities for user interaction of delivered media content. Additionally, skins 306 can also provide a display of information relative to the media content file including, but not limited to, song title, artist name, album title, artist bio, and other features such as purchase inquiries, advertising, and the like.

Furthermore, when system hook 305 is unable to govern a function of the media player application operable on a client computer system, e.g., 210, such that client computer system could be in non-compliance with DMCA and/or RIAA restrictions, a skin 306 can be implemented to provide compliance.

Differing skins 306 can be implemented depending upon the DMCA and/or RIAA restrictions applicable to each media content file. For example, in one embodiment, a skin 306*a* may be configured for utilization with a media content file protected under a non-interactive agreement (DMCA), such that skin 306*a* may not include a pause function, a stop function, a selector function, and/or a save function, etc. Another skin, e.g., skin 306*b* may, in one embodiment, be configured to be utilized with a media content file protected under an interactive with "no save" agreement (DMCA), such that skin 306*b* may include a pause function, a stop function, a selector function, and for those media files having an interactive with "save" agreement, a save or a burn to CD function.

Still referring to FIG. 3, it is further noted that in the present embodiment, each skin 306 can have a unique name and signature. In one embodiment, skin 306 can implemented, in part, through the utilization of an MD (message digest) 5 hash table or similar algorithm. An MD 5 hash table can, in one implementation, be a check-sum algorithm. It is well known in the art that a skin, e.g., skin 306, can be renamed and/or modified to incorporate additional features and/or functionalities in an unauthorized manner. Since modification of the skin would change the check sum and/or MD 5 hash, without knowledge of the MD 5 hash table, changing the name or modification of the skin may simply serve to disable the skin, in accordance with one embodiment of the present invention. Since copyright compliance mechanism 300 verifies skin 306, MD5 hash tables advantageously provide a deterrent against skin name changes and/or modifications made thereto.

In one embodiment, copyright compliance mechanism 300 also includes one or more custom media device driver(s) 307 for providing an even greater measure of control over the media stream while increasing compliance reliability. A client computer system, e.g., 210, is configured to utilize a custom media device application, e.g., a custom audio device application, a custom video device application, etc., that is emulated by a custom media device driver 307. With reference to audio media, the emulation is performed in a waveform audio driver associated with a custom audio device. Driver 307 is configured to receive a media file being outputted by system 210 prior to the media file being sent to a media output device, e.g., a video card for video files or a sound card for audio files, etc. In one embodiment, client computer system 210 is configured with a custom media device driver 307 as the default device driver for media file output. In one embodiment, an existing GUI (graphical user interface) can be utilized or a GUI can be provided, e.g., by utilization of a skin 306 or a custom web based player application, for forcing or requiring system 210 to have driver 307 as the default driver.

Therefore, when a media content file is received by system 210 from server 251, the media content file is playable, provided the media content file passes through the custom media device application, emulated by custom media device driver 307, prior to being outputted. However, if an alternative media player application is selected, delivered media files from server 251 will not play on system 210.

Thus, secured media player applications would issue a media request to the driver for the custom media device which then performs necessary media input suppression, e.g., waveform suppression for audio files, prior to forwarding the request to the default Windows™ media driver, e.g., waveform audio driver for audio files.

It is noted that requests for non-restricted media files can pass directly through custom media device driver 307 to a Windows™ waveform audio driver operable on system 210, thus reducing instances of incompatibilities with existing media player applications that utilize waveform media, e.g., audio, video, etc. Additionally, media player applications that do not support secured media would be unaffected. It is further noted that for either secured media or non-restricted media, e.g., audio media files, waveform input suppression can be triggered by other components of CCM 300, e.g., agents 304, system hooks 305, and skins 306, or a combination thereof, to be active when a recording operation is initiated simultaneously with playback of secured media files, e.g., audio files. Custom device drivers are well known and can be coded and implemented in a variety of ways including, but limited to, those found at developers network web sites, e.g., a Microsof™ or alternative OS (operating system) developer web sites.

Advantageously, by virtue of system 210 being configured with a custom media device, emulated by a custom media device driver 307, as the default device driver, those media player applications that require their particular device driver to be the default driver, e.g., Total Recorder, etc., are rendered non-functional for secured music. Further advantageous is that an emulated custom media device provides no native support for those media player applications used as a recording mechanism, e.g., DirectSound capture, etc., that are able to bypass user-mode drivers for most media devices. Additionally, by virtue of the media content being sent through device driver 307, thus effectively disabling unauthorized saving/recording of media files, in one embodiment, media files that are delivered in a secured delivery system do not have to be encrypted, although, in another embodiment, they still may be encrypted. By virtue of non-encrypted media files utilizing less storage space and network resources than encrypted media files, networks having limited resources can utilize the functionalities of driver 307 of CCM 300 to provide compliance with copyright restrictions and/or licensing agreements applicable with a media content file without having the processing overhead of encrypted media files.

Figure 4:
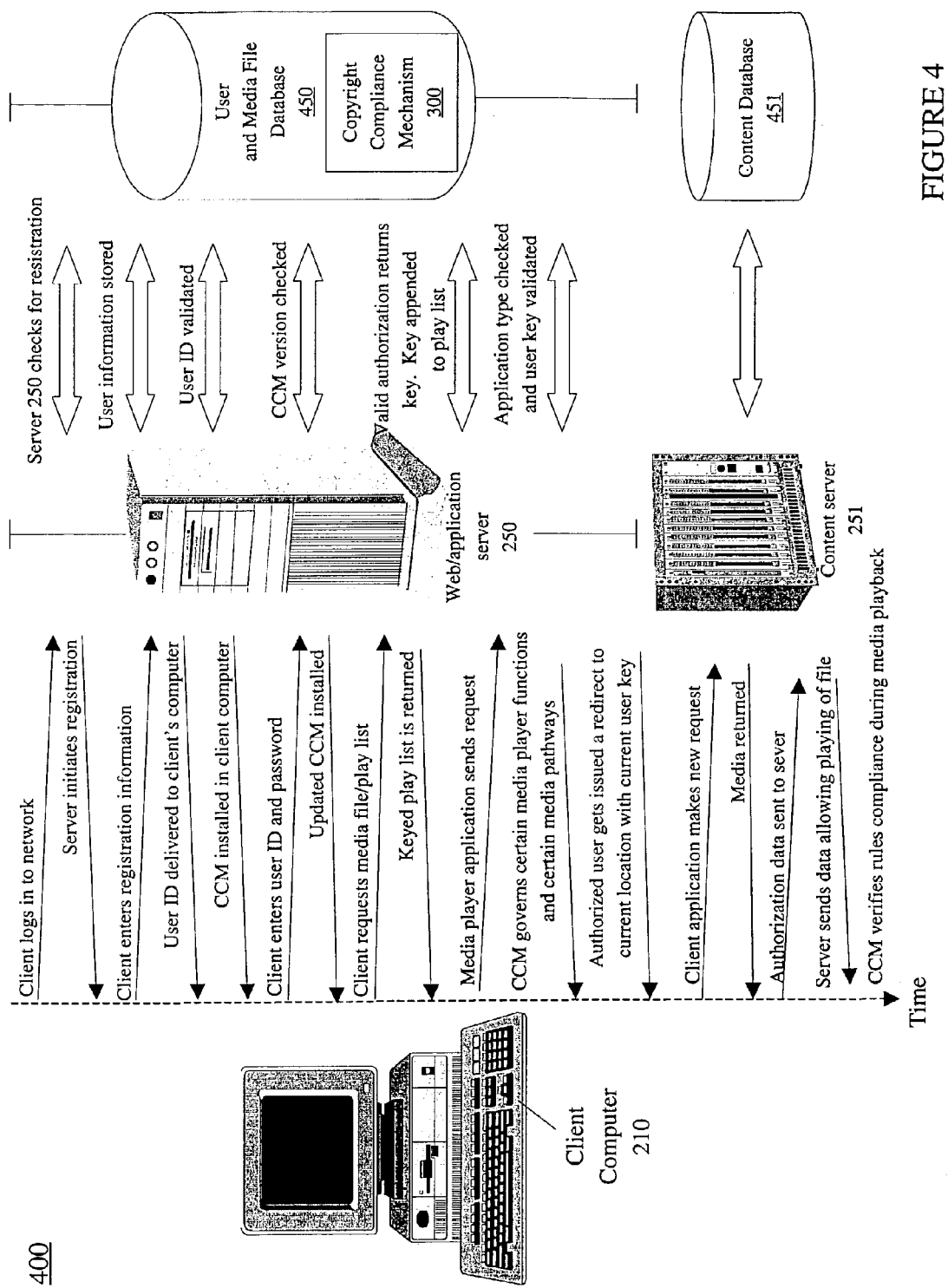
FIG. 4 is an illustration of an exemplary system for implementing a copyright compliance mechanism in accordance with an embodiment of the present invention.

FIG. 4 is an illustration of an exemplary system 400 for implementing a copyright compliance mechanism in accordance with an embodiment of the present invention. Specifically, system 400 illustrates web server 250, content server 251, or a combination of web server 250 and content server 251 installing a copyright compliance mechanism (e.g., 300) in a client's computer system (e.g., 210) for controlling media file distribution and controlling user access and interaction of copyrighted media files, in one embodiment of the present invention.

Client computer system 210 can communicatively couple with a network (e.g., 200) to request a media file, a list of available media files, or a play list of audio files, e.g., MP3 files, etc. In response, web server 250 determines if the request originates from a registered user authorized to receive media files associated with the request. If the user is not registered with the network, web server 250 can initiate a registration process with the requesting client 210. Client registration can be accomplished in a variety of ways. For example, web server 250 may deliver to a client 210 a registration form having various text entry fields into which the user can enter required information. A variety of information can be required from the user by web server 250 including, but not limited to, user's name, address, phone number, credit card number, verifiable email address, and the like. In addition, registration can, in one embodiment, include a requirement for the user to select a username and password.

Still referring to FIG. 4, web server 250 can, in one embodiment, detect information related to the client's computer system, e.g., 210, and store that information in a user/media database 450. For example, web server 250 can detect a unique identifier of client computer system 210. In one embodiment, the unique identifier can be the MAC (machine address code) address of a NIC (network interface card) of client computer system 210 or the MAC address of the network interface adapter integrated on the motherboard of system 210. It is understood that a NIC enables a client computer system 210 to access web server 250 via Internet 201. It is well known that each NIC typically has a unique identifying number MAC address. Further, web server 250 can, in one embodiment, detect and store (also in database 450) information regarding the types(s) of media player application(s), e.g., Windows Media Player™, Real Player™, iTunes player™ (Apple), Live 365™ player, and those media player applications having recording functionality, e.g., Total Recorder, Cool Edit 2000, Sound Forge, Sound Recorder, Super MP3 Recorder, and the like, that are present and operable in client computer system 210. In one embodiment, the client information is verified for accuracy and is then stored in a user database (e.g., 450) within web server 250.

Subsequent to registration completion, creation of the user ID and password, and obtaining information regarding client computer system 210, all or part of this information can be installed in client computer system 210. In one embodiment, client computer system 210 information can be in the form of a cookie. Web server 250 then verifies that the user and client computer system 210 data is properly installed therein and that their integrity has not been compromised. Subsequently, web server 250 installs a copyright compliance mechanism (e.g., 300) into the client's computer system, e.g., 210, in one embodiment of the present invention. It is noted that web server 250 may not initiate installation of CCM 300 until the user ID, password, and client computer system 210 information is verified. A variety of common techniques can be employed to install CCM 300. For example, copyright compliance mechanism 300 can be installed in a hidden directory within client computer system 210, thereby preventing unauthorized access to it. In one embodiment of the present invention, it is noted that unless CCM 300 is installed in client computer system 210, its user will not be able to request, access, or have delivered thereto, media files stored by web server 250 and/or content server 251, Referring still to FIG. 4, upon completion of client registration and installation of CCM 300, client computer system 210 can then request a media play list or a plurality of play lists, etc. In response, web server 250 determines whether the user of client computer system 210 is authorized to receive the media play list associated with the request. In one embodiment, web server 250 can request the username and password. Alternatively, web server 250 can utilize user database 450 to verify that computer 210 is authorized to receive a media play list. If client computer 210 is not authorized, web server 250 can initiate client registration, as described herein. Additionally, web server 250 can disconnect computer 210 or redirect it to an alternative web site. Regardless, if the user and client computer system 210 are not authorized, web server 250 will not provide the requested play list to client computer system 210.

However, if client computer system 210 is authorized, web server 210 can check copyright compliance mechanism 300 within data base 450 to determine if it, or any of the components therein, have been updated since the last time client computer system 210 logged in to web server 250. If a component of CCM 300 has been updated, web server 250 can install the updated component and/or a more current version of CCM 300 into client computer system 210, e.g., via Internet 201. If CCM 300 has not been updated, web server 250 can then deliver the requested media play list to system 210 via Internet 201 along with an appended user key or user identification (ID). It is noted that user database 450 can also include data for one or more media play lists that can be utilized to provide a media play list to client computer system 210. Subsequently, the user of client computer system 210 can utilize the received media play list in combination with the media player application operating on system 210 to transmit a delivery request for one or more desired pieces of media content from web server 250. It is noted that the delivery request contains the user key for validation purposes.

Still referring to FIG. 4, upon receiving the media content delivery request, web server 250 can then check the validity of the requesting media application and the attached user key. In one embodiment, web server 250 can utilize user database 450 to check their validity. If either or both are invalid, web server 250, in one embodiment, can redirect unauthorized client computer system 210 to an alternative destination to prevent abuse of the system. However, if both the requesting media application and the user key are valid, CCM 300 verifies that skins 306 are installed in client computer system 210. Additionally, CCM 300 further verifies that system hook(s) 305 have been run or are running to govern certain functions of those media player applications operable within client computer system 210 that are known to provide non-compliance with the DMCA and/or the RIAA. Additionally, CCM 300 further diverts and/or redirects certain pathways that are commonly used for recording. Once CCM 300 has performed the above described functions, web server 250 then, in one embodiment, issues to the client computer 210 a redirect command to the current address location of the desired media file content along with an optional time sensitive access key, e.g., for that hour, day, or other defined timeframe.

In response to the client computer system 210 receiving the redirect command from web server 250, the media player application operating on client computer system 210 automatically transmits a new request and the time sensitive access key to content server 251 for delivery of one or more desired pieces of media content. The validity of the time sensitive access key is checked by content server 251. If invalid, unauthorized client computer 210 is redirected by content server 250 to protect against abuse of the system and unauthorized access to content server 251. If the time sensitive access key is valid, content server 251 retrieves the desired media content from content database 45 land delivers it to client computer system 210. It is noted that, in one embodiment, the delivered media content can be stored in hidden directories and/or custom file systems that may be hidden within client computer system 210 thereby preventing future unauthorized distribution. In one embodiment, an HTTP (hypertext transfer protocol) file delivery system is used to deliver the requested media files, meaning that the media files are delivered in their entirety to client computer system 210, as compared to streaming media which delivers small portions of the media file.

Still referring to FIG. 4, it is noted that each media file has, in one embodiment, had a header attached therewith prior to delivery of the media file. In one embodiment, the header can contain information relating to the media file, e.g., title or media ID, media data such as size, type of data, and the like. The header can also contain a sequence or key that is recognizable to copyright compliance mechanism 300 that identifies the media file as originating from a content server 251. In one embodiment, the header sequence/key can also contain instructions for invoking the licensing agreements and/or copyright restrictions that are applicable to that particular media file.

Additionally, if licensing agreements or copyright restrictions are changed, developed, or created, or if new media player applications, with or without recording functionality, are developed, CCM 300 would have appropriate modifications made to portions of components, entire components, combinations of components, and/or the entire CCM 300 to enable continued compliance with licensing agreements and copyright restrictions. Furthermore, subsequent to modification of copyright compliance mechanism 300, modified portions of, or the entire updated CCM 300 can easily be installed in client computer system 210 in a variety of ways. For example, the updated CCM 300 can be installed during client interaction with web server 250, during user log-in, and/or while client computer system 210 is receiving the keyed play list.

Referring still to FIG. 4, it is further noted that, in one embodiment, the media files and attached headers can be encrypted prior to being stored within content server 251. In one embodiment, the media files can be encrypted utilizing randomly generated keys. Alternatively, variable length keys can be utilized for encryption. It is noted that the key to decrypt the encrypted media files can be stored in a database 450, content database 451 or in some combination of databases 450 and 451. It is further noted that the messages being passed back and forth between client computer system 210 and web server 250 can also be encrypted, thereby protecting the media files and the data being exchanged from unauthorized use or access. There are a variety of encryption mechanisms and programs that can be implemented to encrypt this data including, but not limited to, exclusive OR, shifting with adds, public domain encryption programs such as Blowfish, and non-public domain encryption mechanisms. It is also noted that each media file can be uniquely encrypted, such that if the encryption code is cracked for one media file, it is not applicable to other media files. Alternatively, groups of media files can be similarly encrypted. Furthermore, in another embodiment, the media files may not be encrypted when being delivered to a webcaster known to utilize a proprietary media player application, e.g., custom media device driver 307.

Subsequent to media file decryption, the media file may be passed through CCM 300, e.g., a coder/decoder 303, to a media player application operating on client computer system 210 which can then access and utilize the delivered high fidelity media content, enabling its user(s) to experience the media content, e.g., listen to it, watch it, view it, or the like. In one embodiment of the present invention, a specialized or custom media player may or may not be required to experience the media content, e.g., skin 306 of FIG. 3. A skin 306 may be necessary when CCM 300 cannot modify an industry standard media player application to comply with copyright restrictions and/or licensing agreements in accordance with the DMCA. Alternatively, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, e.g., in a frame by frame basis or in a buffer, coder/decoder 303 will repeatedly ensure that CCM 300 rules are being enforced at any particular moment during media playback, shown as step 550 of FIG. 5C.

As the media file content is delivered to the media player application, periodically, e.g., after a specified number of frames, after a defined period of time, or any desired time or data period, coder/decoder 303 repeatedly determines whether or not all the rules are enforced, in accordance with rules as defined by CCM 300. If the rules are not enforced, e.g., change due to a user opening up a recording application, e.g., Total Recorder or alternative application, the presentation of the media content is, in one embodiment, suspended or halted. In another embodiment, the presentation of the media content can be modified to output the media content non audibly, e.g., silence. In yet another embodiment, the media content may be audible but recording functionality can be disabled, such that the media content cannot be recorded. These presentation stoppages are collectively shown as step 551 of FIG. 5C.

If the rules, in accordance with CCM 300, are enforced, the codec/decoder 303 retrieves a subsequent portion of the media content that is stored locally in client computer system 210. The newly retrieved portion of the media file is then presented by the client's media player application. While the newly retrieved portion is presented, CCM 300 then again checks that the rules are enforced, and retrieves an additional portion of the media file or suspends presentation of the media file is the rules are not being enforced, and these steps are performed repeatedly throughout the playback of the media file, in a loop environment, until the media file's contents have been presented in their entirety. Advantageously, by constant monitoring during playing of media files, CCM 300 can detect undesired activities and enforces those rules as defined by CCM 300.

Figure 5A:
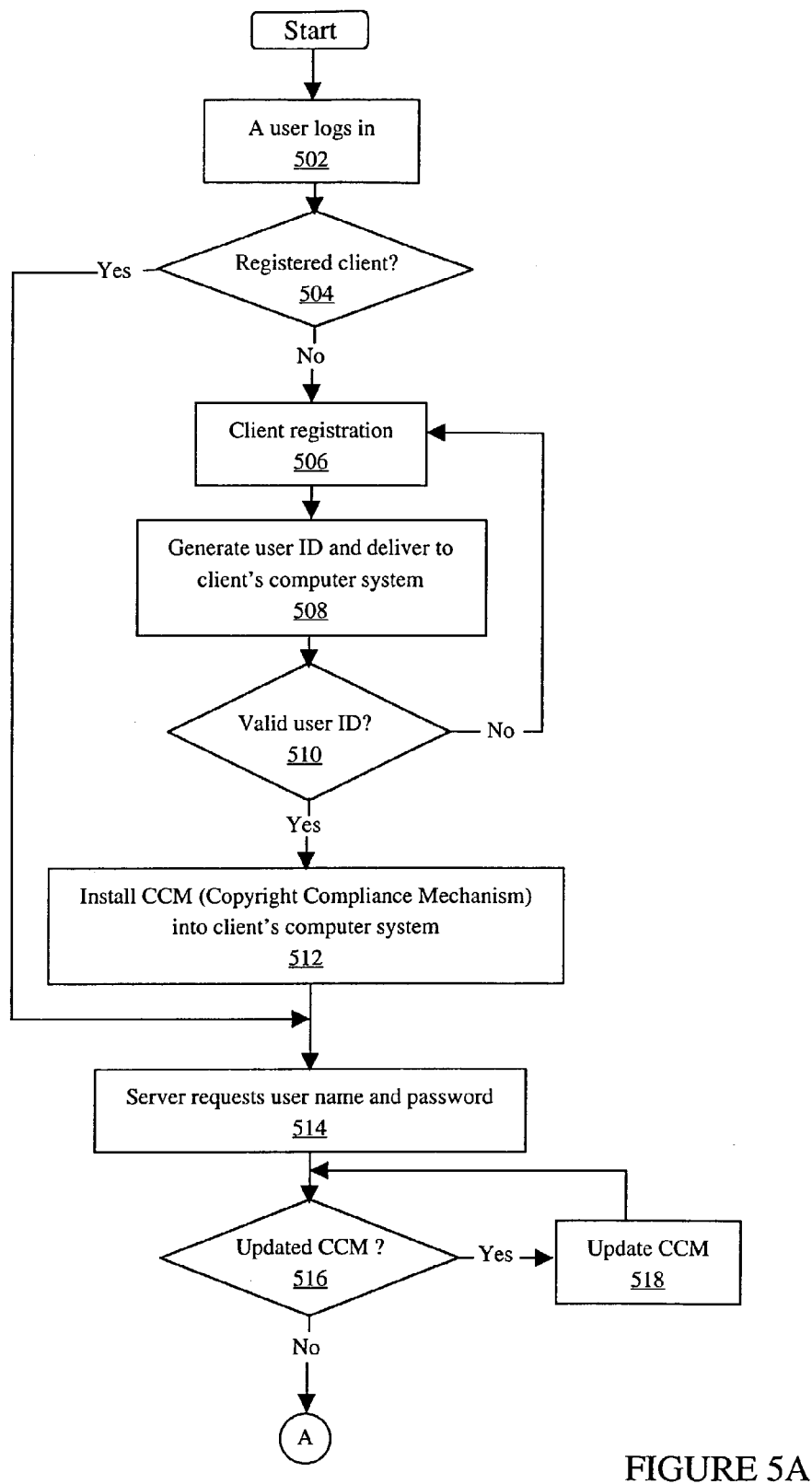
FIGS. 5A, 5B, and 5C are a flowchart of steps performed in accordance with an embodiment of the present invention for providing a copyright compliance mechanism to a network of client and server computer systems.
Figure 5B:
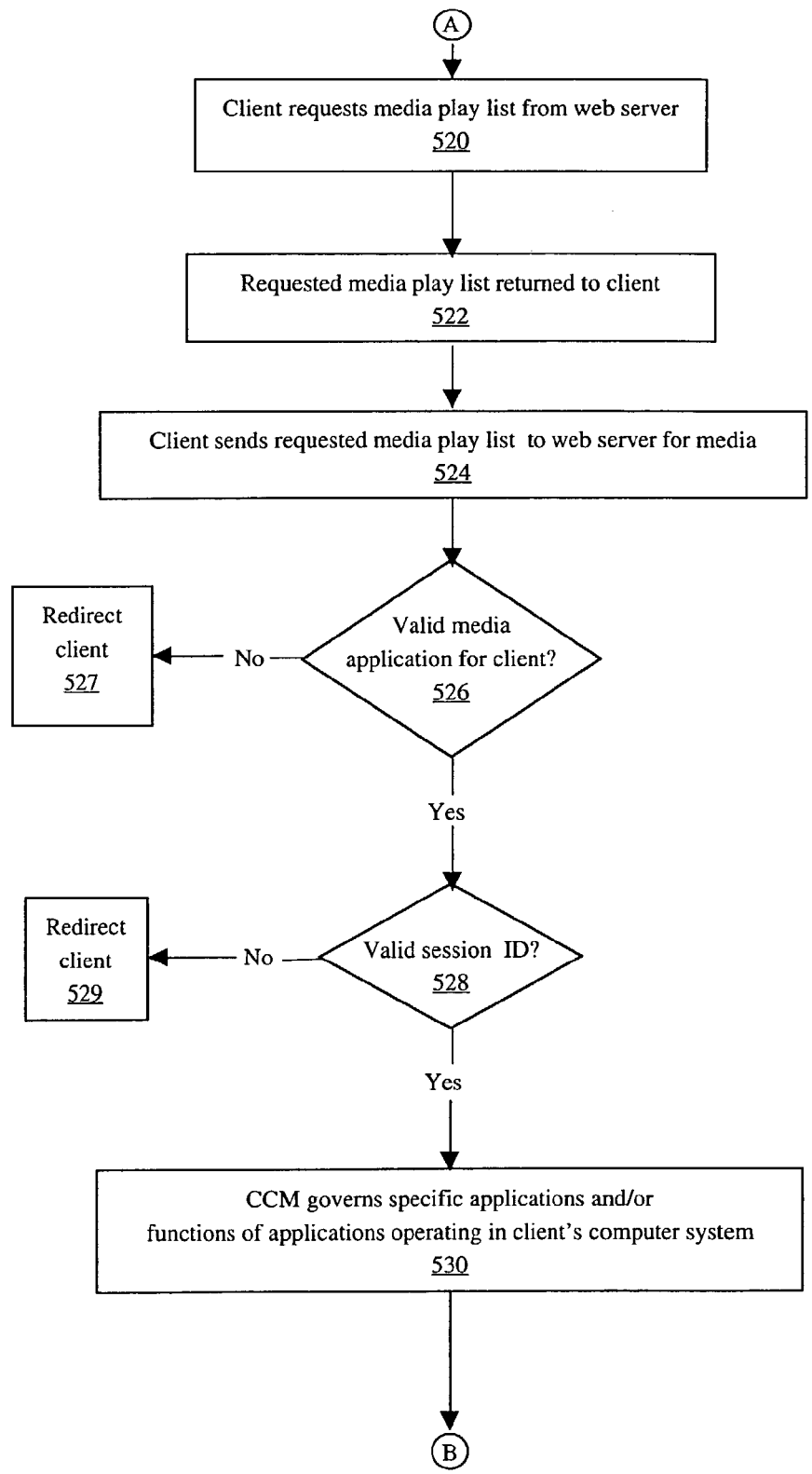
Figure 5C:
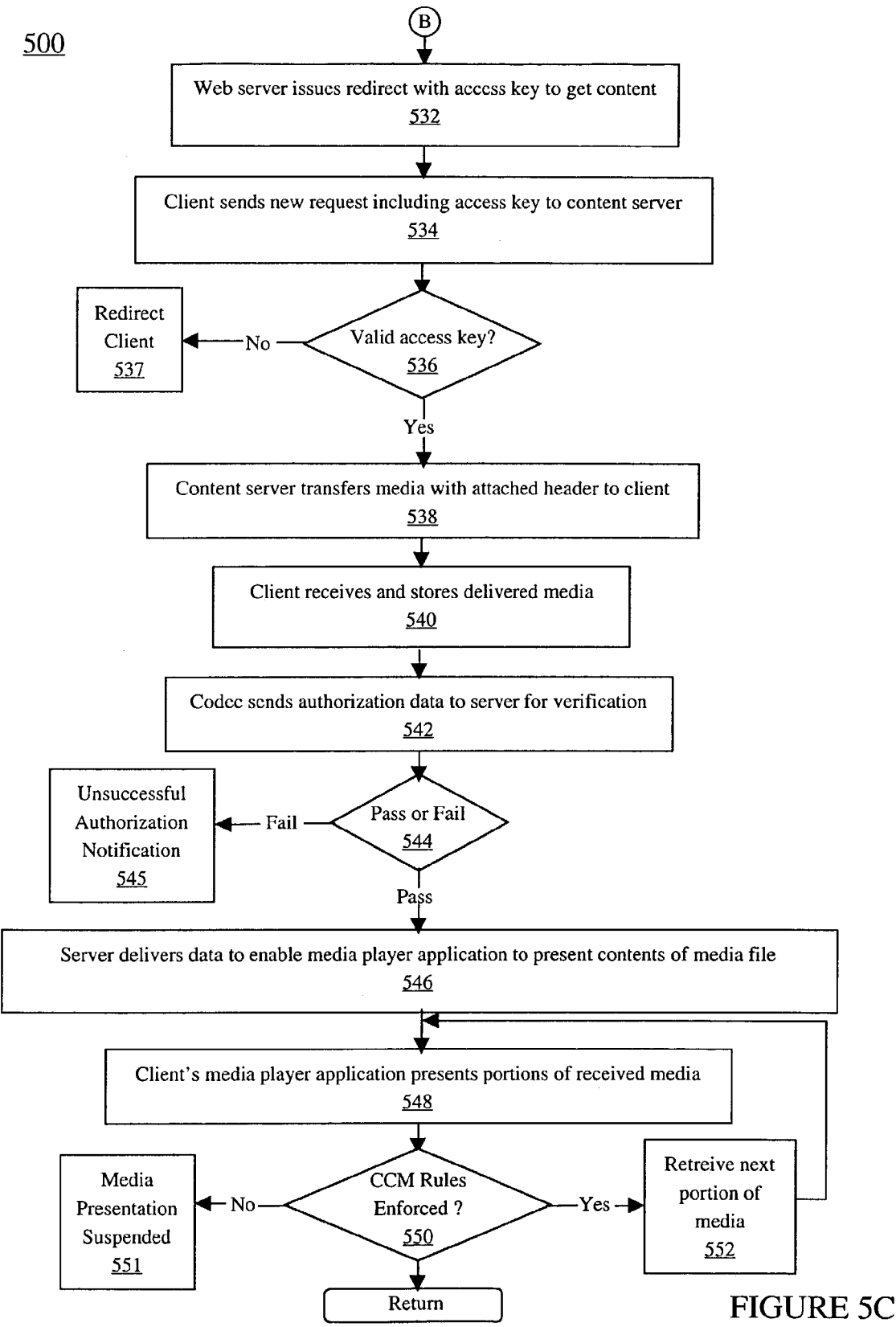

FIGS. 5A, 5B, and 5C, are a flowchart 500 of steps performed in accordance with one embodiment of the present invention for controlling end user interaction of delivered electronic media. Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 103 of FIG. 1. However, the computer readable and computer executable instructions may reside in any type of computer readable medium. Although specific steps are disclosed in flowchart 500, such steps are exemplary. That is, the present invention is well suited to performing various other steps or variations of the steps recited in FIGS. 5A, 5B, and 5C. Within the present embodiment, it should be appreciated that the steps of flowchart 500 may be performed by software, by hardware or by any combination of software and hardware.

The present embodiment provides a mechanism for controlling interaction of high fidelity media content delivered via one or more communication networks. The present embodiment delivers the high fidelity media content to registered clients while preventing unauthorized clients from directly receiving media content from a source database. Once the client computer system receives the media content, it can be stored in hidden directories and/or custom file systems that may be hidden to prevent subsequent unauthorized sharing with others. It is noted that various functionalities can be implemented to protect and monitor the delivered media content. For example, the physical address of the media content can be hidden from media content recipients. In another example, the directory address of the media content can be periodically changed. Additionally, an access key procedure and rate control restrictor can also be implemented to monitor and restrict suspicious media content requests. Furthermore, a copyright compliance mechanism, e.g., CCM 300, can be installed in the client computer system 210 to provide client side compliance with licensing agreements and copyright restrictions applicable to the media content. By implementing these and other functionalities, the present embodiment restricts access to and the distribution of delivered media content and provides a means for copyrighted media owner compensation.

It is noted that flowchart 500 is described in conjunction with FIGS. 2, 3, and 4, in order to more fully describe the operation of the present embodiment. In step 502 of FIG. 5A, a user of a computer system, e.g., 210, causes the computer to communicatively couple to a web server, e.g., 250, via one or more communication networks, e.g., Internet 201, and proceeds to attempt to log in. It is understood that the log in process of step 502 can be accomplished in a variety of ways in accordance with the present invention.

In step 504 of FIG. 5A, web server 250 accesses a user database, e.g., 450, to determine whether the user and the computer system 210 logging in are registered with it. If the user and computer system 210 are registered with web server 250, the present embodiment proceeds to step 514. However, if the user and computer system 210 are logging in for the first time, web server 250 can initiate a user and computer system 210 registration process at step 506.

In step 506, registration of the user and computer system 210 is initiated. The user and computer system registration process can involve the user of computer system 210 providing personal information including, but not limited to, their name, address, phone number, credit card number, and the like. Web server 250 can verify the accuracy of the information provided. Web server 250 can also acquire information regarding the user's computer system 210 including, but not limited to, identification of media players disposed and operable on system 210, a unique identifier corresponding to the computer system, etc. In one embodiment, the unique identifier corresponding to the computer system can be a MAC address. Additionally, web server 250 can further request that the user of computer system 210 to select a username and password.

In step 508 of FIG. 5A, subsequent to the completion of the registration process, web server 250 generates a unique user identification (ID) or user key associated with the user of client computer system 210. The unique user ID, or user key, is then stored by web server 250 in a manner that is associated with that registered user. Furthermore, one or more cookies containing that information specific to that user and the user's computer system 210, is installed in a non-volatile memory device, e.g., 103 and/or data storage device 108 of computer system 210. It is noted that the user ID and cookie can be stored in a hidden directory within one or more non-volatile memory devices within computer system 210, thereby preventing user access and/or manipulation of that information. It is further noted that if the unique user ID, or user key, has been previously generated for the user and computer 210 that initially logged-in at step 502, the present embodiment proceeds to step 514

In step 510, web server 250 verifies that the user ID and the cookie(s) are properly installed in computer system 210 and verifies the integrity of the cookie(s) and the user ID, thereby ensuring no unauthorized alterations to the user ID or the cookie has occurred. If the user ID is not installed and/or not valid, web server 250 can re-initiate the registration process at step 506. Alternatively, web server 250 can decouple computer system 210 from the network, thereby requiring a re-log in by the user of computer 210. If the cookie(s) and user ID are valid, the present embodiment proceeds to step 512.

In step 512 of FIG. 5A, web server 250 can install a version of a copyright compliance mechanism 300 into one or more non-volatile memory devices of computer system 210. Installing CCM 300 into user's computer system 210 facilitates client side compliance with licensing agreements and copyright restrictions applicable to specific delivered copyrighted media content. At step 512, the components of CCM 300, such as instructions 301, coder/decoder (codec) 303, agent programs 304, system hooks 305, skins 306, and custom media device drivers 307, are installed in computer system 210. In one embodiment, a hypertext transfer protocol file delivery system can be utilized to install CCM 300 into computer system 210. However, step 512 is well suited to install CCM 300 on computer system 210 is a wide variety of ways in accordance with the present embodiment.

In step 514, web server 250 can request the previously established username and password of the user of client computer system 210. Accordingly, the user of client computer system 210 causes it to transmit to web server 250 the previously established username and password. Upon the receipt thereof, web server 250 may access a user database, e.g., 450, to determine their validity. If the username and password are invalid, web server 250 refuses access wherein flowchart 500 may be discontinued (not shown). Alternatively, if the username and password are valid, the present embodiment proceeds to step 516.

In step 516 of FIG. 5A, web server 250 can access media file database 450 to determine if copyright compliance mechanism 300 has been updated to reflect changes made to the DMCA (digital millennium copyright act) and/or to the interactive/non-interactive licensing agreements recognized by the DMCA. It is noted that alternative licensing agreements can be incorporated into copyright compliance mechanism 300. Advantageously, by providing a copyright compliance mechanism that can be readily updated to reflect changes in existing copyright restrictions and/or the introduction of other types of licensing agreements, and/or changes to existing media player applications, or the development of new media player applications, copyright compliance mechanism 300 can provide compliance with current copyright restrictions.

Continuing with step 516, if web server 250 determines that CCM 300, or components thereof, of computer 210 has been updated, web server 250 initiates installation of the newer components and/or the most current version of CCM 300 into computer system 210, shown as step 518. If web server 250 determines that the current version of CCM 300 installed on system 210 does not have to be updated, the present embodiment proceeds to step 520 of FIG. 5B.

In step 520 of FIG. 5B, the user of client computer system 210 causes it to transmit to web server 250, e.g., via Internet 201, a request for a play list of available media files. It is noted that the play list can contain all or part of the media content available from a content server, e.g., 251.

In step 522, in response to web server 250 receiving the play list request, web server 250 transmits to client computer system 210 a media content play list together with the unique user ID associated with the logged-in user. The user ID, or user key, can be attached to the media content play list in a manner invisible to the user. It is noted that the media content in content server 251 can be, but is not limited to, high fidelity music, audio, video, graphics, multimedia, alphanumeric data, and the like. The media content play list of step 520 can be implemented in diverse ways. In one example, web server 250 can generate a media content play list by combining all the available media content into a single play list. Alternatively, all of the media content titles, or different lists of titles, can be loaded from content server 251 and passed to a CGI (common gateway interface) program operating on web server 250 where the media titles, or differing lists of titles, can be concatenated into a single dimensioned array that can be provided to client computer system 210. It is understood that the CGI can be written in nearly any software computing language.

In step 524 of FIG. 5B, the user of client computer system 210 can utilize the received media content play list in conjunction with a media player application in order to cause client computer system 210 to transmit a request to web server 250 for delivery of desired media content, and wherein the user ID is automatically included therewith. The media content play list provided to client computer system 210 by web server 250 can enable the user to create one or more customized play lists by the user selecting desired media content titles. It is noted that a customized media play list can establish the media content that will eventually be delivered to client computer system 250 and the order in which the content will be delivered. Additionally, the user of client computer system 250 can create one or more customized play lists and store those play lists in system 250 and/or within web server 250. It is noted that a customized play list does not actually contain the desired media content titles, but rather the play list includes one or more identifiers associated with the desired media content that can include, but is not limited to, a song, an audio clip, a video clip, a picture, a multimedia clip, an alphanumeric document, or particular portions thereof. In another embodiment, the received media content play list can include a random media content delivery choice that the user of client computer system 210 can transmit to web server 250, with the user ID, to request delivery of the media content in a random manner.

In step 526, upon receiving the request for media content from client computer system 210, web server 250 determines whether the requesting media application operating on client computer system 210 is a valid media application. One of the functions of a valid media application is to be a player of media content as opposed to an application that downloads media content in an unauthorized or unregulated manner. If web server 250 determines that the media application operating on system 210 is not a valid media application, the present embodiment proceeds to step 527 which in one embodiment, redirects client computer system 210 to a web site where the user of system 210 can download a valid media player application or to a software application which can identify client computer system 210, log system 210 out of web server 250 and/or prevent future logging-in for a defined period of time, e.g., 15 minutes, an hour, a day, a week, a month, a year, or any specified amount of time. If web server 250 determines that the media application operating on system 210 is a valid media application, the present embodiment proceeds to step 528.

In step 528 of FIG. 5B, the present embodiment causes web server 250 to determine whether the user ID (or user key) that accompanied the media delivery request sent by client computer system 210 is valid. If web server 250 determines that the user ID is invalid, the present embodiment proceeds to step 529 where client computer system 210 can be logged off web server 250 or client computer system 250 can be returned to step 506 (of FIG. 5A) to re-register and to have another unique user ID generated by web server 250. It is noted that the order in which steps 526 and 528 are performed can be altered such that step 528 can be performed prior to step 526. If web server 250 determines that the user ID is valid, the present embodiment proceeds to step 530.

In step 530, prior to web server 250 authorizing the delivery of the redirect and access key for the requested media file content, shown as step 532, CCM 300 governs certain media player applications and/or functions thereof that are operable on client computer system 210. These governed functions can include, pause, stop, progress bar, save, etc. It is noted that, in one embodiment, CCM 300 can utilize system hooks 305 to accomplish the functionality of step 530.

In step 532 of FIG. 5C, the present embodiment causes web server 250 to transmit to client computer system 210 a redirection command along with a time sensitive access key (for that hour, day or for any defined period of time) thereby enabling client computer system 210 to receive the requested media content. The redirection command can include a time sensitive address of the media content location within content server 251. The address is time sensitive because, in one embodiment, the content server 251 periodically renames some or all of the media address directories, thereby making previous content source addresses obsolete. Alternatively, the address of the media content is changed. In another embodiment, the location of the media content can be changed along with the addresses. Regardless, unauthorized users and/or applications are restricted from directly retrieving and/or copying the media content from content server 251. Therefore, if someone with inappropriate or unlawful intentions is able to find where the media content is stored, subsequent attempts will fail, as the previous route no longer exists, thereby preventing future unauthorized access.

It is noted that in one embodiment of the present invention, the addresses (or routes) of content server 251 that are actively coupled to one or more client computer systems (e.g., 210-230) are maintained while future addresses, or routes, are being created for new client devices. It is further noted that as client computer systems are uncoupled from the media content source of content server 251, that directory address, or link, can be immediately changed, thereby preventing unauthorized client system or application access.

In another embodiment, the redirection of client computer system 210 to content server 251 can be implemented by utilizing a server network where multiple servers are content providers, (e.g., 251), or by routing a requesting client computer system (e.g., 210, 220, or 230) through multiple servers. In yet another embodiment, the delivery of media content from a central content provider (e.g., 251) can be routed through one or more intermediate servers before being received by the requesting client computer system, e.g., 210-230.

The functionality of step 532 is additionally well suited to provide recordation of the Internet Protocol (IP) addresses of the client computer systems, e.g., 210, the media content requested and its transfer size, thereby enabling accurate monitoring of royalty payments, clock usage and transfers, and media content popularity.

In step 534 of FIG. 5C, upon receiving the redirection command, the present embodiment causes the media application operating on client computer system 210 to automatically transmit to content server 251 a new media delivery request which can include the time sensitive access key and the address of the desired media content.

In step 536 of FIG. 5C, content server 251 determines whether the time sensitive access key associated with the new media delivery request is valid. If content server 251 determines that the time sensitive access key is valid, the present embodiment proceeds to step 538 of FIG. 5C. However, if content server 251 determines that the time access key is not valid, the present embodiment proceeds to step 537, a client redirect.

In step 537, content server redirects client computer 210 to step 532 (not shown) where a new access key is generated. Alternatively, step 537 causes the present embodiment to return to step 504 of FIG. 5A. In yet another embodiment, step 537 causes client computer system 210 to be disconnected from content server 251.

In step 538 of FIG. 5C, content server 251 transmits the requested high fidelity media content to client computer system 210. It is noted that each media content file delivered to client computer system 210 can have a header attached thereto, prior to delivery, as described with reference to FIG. 4. It is further noted that both the media content and the header attached thereto can be encrypted. In one embodiment, the media content and the header can be encrypted differently. Alternatively, each media content file encrypted differently. In another embodiment, groups of media files are analogously encrypted. It is noted that public domain encryption mechanisms, e.g., Blowfish, and/or non-public domain encryption mechanisms can be utilized.

Still referring to step 538, content server 251 transmits the requested media content in a burst load (in comparison to a fixed data rate), thereby transferring the content to client computer system 210 as fast as the network transfer rate allows. Further, content server 251 can have its download rate adapted to be equal to the transfer rate of the network to which it is coupled. In another embodiment, the content server 251 download rate can be adapted to equal the network transfer rate of the client computer system 210 to which the media content is being delivered. For example, if client computer system 210 is coupled to Internet 201 via a T1 connection, then content server 251 transfers the media content at transmission speeds allowed by the T1 connection line. As such, once the requested media content is transmitted to client computer system 210, content server 251 is then able to transmit requested media content to another client computer system, e.g., 220 or 230. Advantageously, this provides an efficient means to transmit media content, in terms of statistical distribution over time and does not overload the communication network(s).

It is noted that delivery of the requested media content by content server 250 to client computer system 210 can be implemented in a variety of ways. For example, an HTTP (hypertext transfer protocol) file transfer protocol can be utilized to transfer the requested media content as well as a copyright compliance mechanism 300 to client 210. In this manner, the copyright compliance mechanism as well as each media content file/title can be delivered in its entirety. In another embodiment, content server 251 can transmit to client computer system 250 a large buffer of media content, e.g., audio clips, video clips, and the like.

In step 540 of FIG. 5C, upon receiving the requested high fidelity media content from content server 251, the present embodiment causes client computer system 210 to store the delivered media content in a manner that is ready for presentation, e.g., play. The media content is stored in client computer system 210 in a manner that restricts unauthorized redistribution. For example, the present embodiment can cause the high fidelity media content to be stored in a volatile memory device, utilizing one or more hidden directories and/or custom file systems that may be hidden, where it may be cached for a limited period of time. Alternatively, the present embodiment can cause the high fidelity media content to be stored in a non-volatile memory device, e.g., 103 or data storage device 108. It is noted that the manner in which each of the delivered media content file(s) is stored, volatile or non-volatile, can be dependent upon the licensing restrictions and copyright agreements applicable to each media content file. It is further noted that in one embodiment, when a user of client computer system 210 turns the computer off or causes client computer system 210 to disconnect from the network, the media content stored in a volatile memory device is typically deleted therefrom.

Still referring to step 540, in another embodiment, the present embodiment can cause client computer system 210 to store the received media content in a non-volatile manner within a media application operating therein, or within one of its Internet browser applications (e.g., Netscape Communicator™, Microsoft Internet Explorer™, Opera™, Mozilla™, and the like) so that delivered media content can be used in a repetitive manner. Further, the received media content can be stored in a manner making it difficult for a user to redistribute in an unauthorized manner, while allowing the user utilization of the received media content, e.g., by utilizing one or more hidden directories and/or custom file systems that may also be hidden. It is noted that by storing media content with client computer system 210 (when allowed by applicable licensing agreements and copyright restrictions), content server 251 does not need to redeliver the same media content to client computer system 210 each time its user desires to experience (e.g., listen to, watch, view, etc.) the media content file.

In step 542 of FIG. 5C, the received media content file is then fed into a media player application, which then runs it through a codec, e.g., coder/decoder 303 of CCM 300, in one embodiment. In response, coder/decoder 303 sends an authorization request to the server, e.g., 251, with attached authorization data, as described herein. In response to receiving codec's 303 authorization request, server 251 compares the received authorization data with that stored in server 251, and subsequently, the present embodiment proceeds to step 544.

In step 544, the server 251 responds with a pass or fail authorization. If server 251 responds with a fail, such that the received authorization data is invalid, the present method can proceed to step 545, where server 251 can, in one embodiment, notify the user of client system 210, e.g., by utilization of skin 306, that there was an unsuccessful authorization of the requested media content file. It is noted that alternative messages having similar meanings may also be presented to the user of client computer system 210, thereby informing the user that the delivery failed. However, if the authorization data passes, the present method proceeds to step 546.

In step 546, server 251 transmits certain data back to the media player application which enables the media player application to present the contents of the media file. In one embodiment, a decryption key can be included in the transmitted data to decrypt the delivered media content file. In another embodiment, an encryption/decryption key can be included in the transmitted data to allow access to the contents of the media file. The present method then proceeds to step 548.

In step 548 of FIG. 5C, subsequent to media file decryption, the media file may be passed through CCM 300, e.g., a coder/decoder 303, to a media player application operating on client computer system 210 which can then access and utilize the delivered high fidelity media content, enabling its user(s) to experience the media content, e.g., listen to it, watch it, view it, or the like. In one embodiment of the present invention, a specialized or custom media player may be required to experience the media content, e.g., skin 306 of FIG. 3. Skin 306 may be necessary when CCM 300 cannot modify an industry standard media player application to comply with copyright restrictions and/or licensing agreements in accordance with the DMCA. Alternatively, a specialized or custom media player may not be needed to experience the media content. Instead, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, e.g., in a frame by frame basis or in a buffer by buffer basis, coder/decoder 303 will repeatedly ensure that CCM 300 rules are being enforced at any particular moment during media playback, shown as step 550.

In step 550, as the media file content is delivered to the media player application, periodically, e.g., after a specified number of frames, after a defined period of time, or any desired time or data period, coder/decoder 303 repeatedly determines whether or not all the rules are enforced, in accordance with rules as defined by CCM 300. If the rules are not enforced, e.g., change due to a user opening up a recording application, e.g., Total Recorder or alternative application, the present method proceeds to step 551. If the rules, in accordance with CCM 300, are enforced, the present method then proceeds to step 552.

In step 551, if the rules according to CCM 300 are not enforced, the presentation of the media content is, in one embodiment, suspended or halted. In another embodiment, the presentation of the media content can be modified to output the media content non audibly, e.g., silence. In yet another embodiment, the media content may be audible but recording functionality can be disabled, such that the media content cannot be recorded.

In step 552, if the rules are enforced, in accordance with CCM 300, coder/decoder 303 retrieves a subsequent portion of the media content that is stored locally in client computer system 210. The newly retrieved portion of the media file is then presented by the client's media player application, shown in the present method as step 548. While the newly retrieved portion is presented, embodiments of the present method then again perform step 550, then step 552 or 551, then step 548, then 550, etc., in a continual loop until the media file contents are presented in their entirety. Advantageously, by constant monitoring during playing of media files, CCM 300 can detect undesired activities and enforces those rules as defined by CCM 300.

Figure 6:
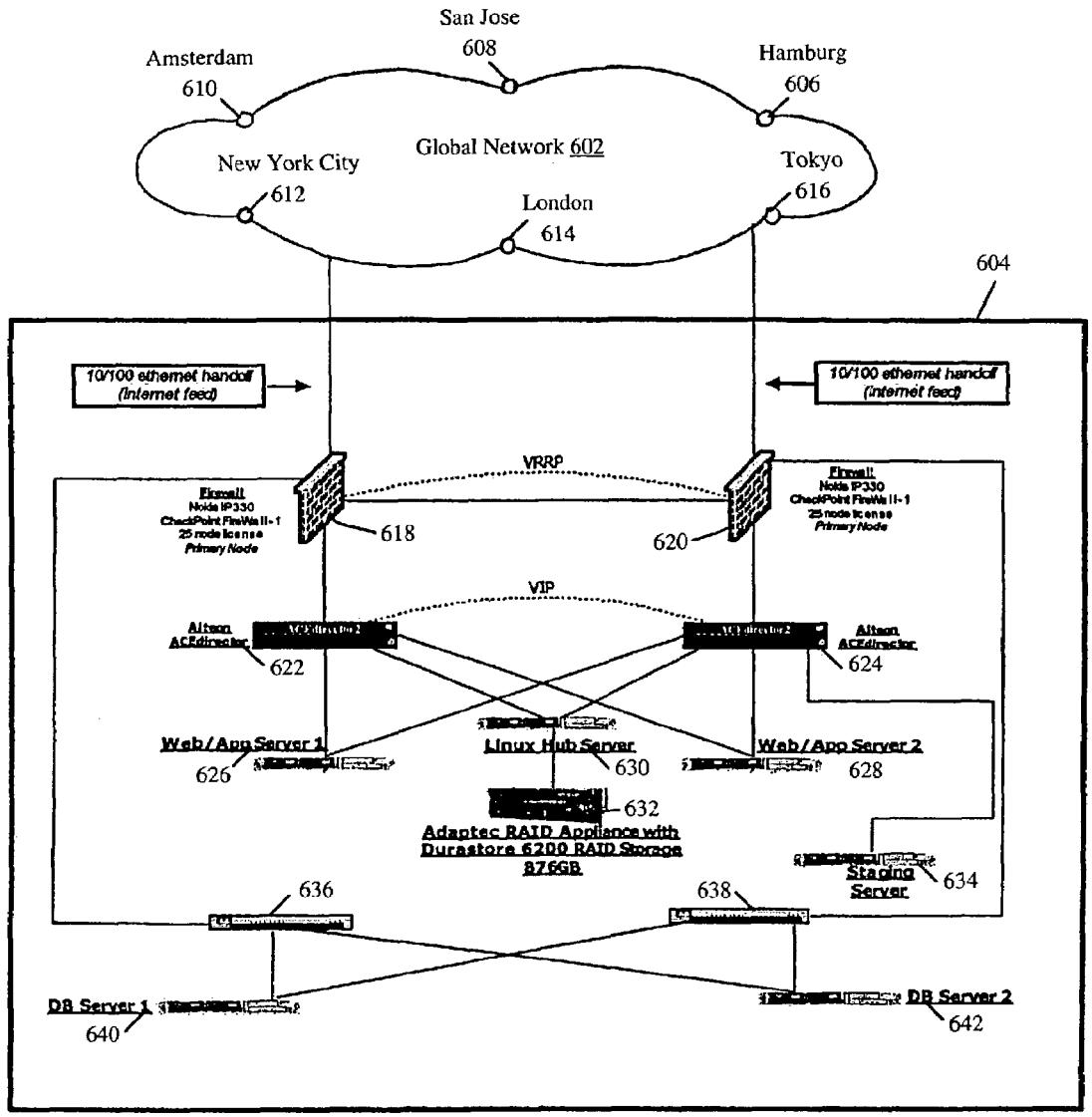
FIG. 6 is a diagram of an exemplary global media delivery system in which a copyright compliance mechanism can be implemented in accordance with an embodiment of the present invention.

FIG. 6 is a diagram of an exemplary high-speed global media content delivery system 600, in accordance with one embodiment of the present invention. In one embodiment, system 600 can be utilized to globally deliver media content, e.g., audio media, video media, graphic media, multimedia, alphanumeric media, etc., to a client computer system, e.g., 210, 220, and/or 230, in conjunction with a manner of delivery similar to that described herein. In one embodiment, system 600 includes a global delivery network 602 that can include multiple content servers, e.g., 604, 606, 608, 610, 612, 614, and 616, that can be located throughout the world and which may be referred to as points of presence or media delivery point(s). Each of content server 604-616 can store a portion, a substantial portion, or the entire contents of a media content library that can be delivered to client computer systems via a network, e.g., Internet 201, or a WAN (wide area network). Accordingly, each of content server 604-616 can provide media content to of client computer systems in its respective vicinity in the world. Alternatively, each content server can provide media content to a substantial number of client computer systems For example, a media delivery point (MDP) 616, located in Tokyo, Japan, is able to provide and deliver media content from the media content library stored in its content database, e.g., 451, to client computer systems within the Asiatic regions of the world while a media delivery point 612, located in New York City, N.Y., USA, is able to provide and deliver media content from its stored media content library to client devices within the Eastern United States and Canada. It is noted that each city name, e.g., London, Tokyo, Hamburg, San Jose, Amsterdam, or New York, associated with one of the media delivery points 604-616 represents the location of that particular media delivery point or point of presence. However, it is further noted that these city names are exemplary because media delivery points 604-616 can located anywhere within the world, and as such are not limited to the cities shown in global network 602.

Still referring to FIG. 6, it is further noted that global system 602 is described in conjunction with FIGS. 2, 3, 4, and 5, in order to more fully describe the operation of embodiment of the present invention. Particularly, subsequent to a client computer system, e.g., client computer system 210 of FIG. 2, interacting with a web server, e.g., web server 250 of FIG. 2, as described herein, web server 250, in one embodiment, can redirect client computer system 210 to receive the desired media content from an MDP (e.g., 604-616) based on one or more differing criteria.

For example, computer system 210 may be located in Brattleboro, Vt., and its user causes it to log-in with a web server 250 which can be located anywhere in the world. It is noted that steps 502-530 of FIGS. 5A and 5B can then be performed as described herein such that the present embodiment proceeds to step 532 of FIG. 5C. At step 532, the present embodiment can determine which media delivery points, e.g., 604, 606, 608, 610, 612, 614, or 616, can subsequently provide and deliver the desired media content to client computer system 210.

Still referring to FIG. 6, one or more differing criteria can be utilized to determine which media delivery point to select for delivery of the desired media content. For example, the present embodiment can base its determination upon which media delivery point is in nearest proximity to client computer system 210, e.g., media delivery point 616. This can be performed by utilizing the stored registration information, e.g., address, provided by the user of client computer system 210. Alternatively, the present embodiment can base its determination upon which media delivery point provides media content to the part of the world in which client computer system is located. However, if each media delivery point (e.g., 604-616) stores differing media content, the present embodiment can determine which one can actually provide the desired media content. It is noted that these are exemplary determination criteria and the embodiments of the present invention are not limited to such implementation.

Subsequent to determination of which media delivery point is to provide the media content to client computer system 210 at step 532, web server 250 transmits to client computer system 210 a redirection command to media delivery point/content server 612 along with a time sensitive access key, also referred to as a session key, (e.g., for that hour, day, or any defined time frame) thereby enabling client computer system 210 to eventually receive the requested media content. Within system 600, the redirection command can include a time sensitive address of the media content location within media delivery point 612. Accordingly, the New York City media delivery point 612 can subsequently provide and deliver the desired media content to client computer system 210. It is noted that steps 532-542 and step 537 of FIG. 5C can be performed by media delivery point 512 in a manner similar to content server 251 described herein.

Advantageously, by utilizing multiple content servers, e.g., media delivery point 604-616, to provide high fidelity media content to client computer systems, e.g., 210-230, located throughout the world, communication network systems of the Internet 201 do not become overly congested. Additionally, global network 602 can deliver media content to a larger number of client computer systems (e.g., 210-230) in a more efficient manner. Furthermore, by utilizing communication technology having data transfer rates of up to 320 Kbps (kilobits per second) or higher, embodiments of the present invention provide for rapid delivery of the media content in a worldwide implementation.

Referring still to FIG. 6, it is noted that media delivery points/content servers 604-616 of global network 602 can be coupled in a wide variety of ways in accordance with the present embodiment. For example, media delivery point 604-616 can be coupled utilizing wired and/or wireless communication technologies. Further, it is noted that media delivery points 604-616 can be functionally coupled such that if one of them fails, another media delivery point can take over and fulfill its functionality. Additionally, one or more web servers similar to web server 250 can be coupled to global network 602 utilizing wired and/or wireless communication technologies.

Within system 600, content server/media delivery point 604 includes a web infrastructure that, in one embodiment, is a fully redundant system architecture. It is noted that each MDP/content server 606-616 of global network 602 can be implemented to include a web infrastructure in a manner similar to the implementation shown in MDP 604.

Specifically, the web infrastructure of media delivery point 604 includes firewalls 618 and 620 which are each coupled to global network 602. Firewalls 618 and 620 can be coupled to global network 602 in diverse ways, e.g., utilizing wired and/or wireless communication technologies. Particularly, firewalls 618 and 620 can each be coupled to global network 602 via a 10/100 Ethernet handoff. However, system 600 is not limited in any fashion to this specific implementation. It is noted that firewalls 618 and 620 are implemented to prevent malicious users from accessing any part of the web infrastructure of media delivery point/content 604 in an unauthorized manner. Additionally, firewall 618 includes a device 636, e.g., a router or other switching mechanism, coupled therewith and a DB (database) server 640 coupled to device 636 while firewall 620 includes a device 638, e.g., a router or other switching mechanism, coupled therewith and a DB (database) server 642 coupled to device 638. Furthermore, DB server 640 is coupled with device 638 and DB server 542 is coupled with device 536.

Still referring to FIG. 6, and within media delivery point 604, firewall 618 is coupled to a director device 622 which is coupled to internal web application server 626 and 628, and a hub server 630. Firewall 620 is coupled to a director 624 which is coupled to internal web application servers 626 and 628, and hub server 630. Hub server 630 can be implemented in a variety of ways including, but not limited to, as a Linux hub server. Hub server 530 is coupled to a data storage device 632 capable of storing media content. Data storage device 632 can be implemented in a variety of ways, e.g., as a RAID (redundant array of independent disks) appliance.

It is noted that media delivery points 604-616 can be implemented in any manner similar to content server 250 described herein. Additionally, media delivery points 604-616 of the present embodiment can each be implemented as one or more physical computing devices, e.g., computer system 100 of FIG. 1.

Advantageously, by providing a copyright compliance mechanism, e.g., 300, which can be easily and readily installed in a client computer system, e.g., 210, embodiments of the present invention can be implemented to control access to, control the delivery of, and control the user's experience with media content subject to copyright restrictions and licensing agreements, fore example, as defined by the DMCA. Additionally, by closely associating a client computer system, e.g., 210, with the user thereof, and the media content they receive, embodiments of the present invention further provide for accurate royalty recording.

The foregoing disclosure regarding specific embodiments of the present invention have been presented for purposes of illustration and description. They are not intended to be exhaustive or to limit the invention to the precise forms disclosed, and many modifications and variations are possible in light of above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of controlling interaction of deliverable electronic media comprising:
    detecting a media player application operable with a computer system, said media player application for enabling said computer system to present contents of a media file; and
    utilizing a compliance mechanism to control an output of said media file by said media player, said compliance mechanism diverting a commonly used data pathway output of said media player application to a controlled data output pathway monitored by said compliance mechanism after said media player begins to present said contents of said media file, said compliance mechanism utilized to stop or disrupt the playing of said content of said media file at said controlled data output pathway when said playing of said content of said media file is outside of said usage restriction applicable to said media file.

2. The method as recited in claim 1 further comprising delivering said media file to said computer system, said media file delivered from a server coupled with said computer system.

3. The method as recited in claim 2 further comprising attaching a header to said media file prior to delivery to said computer system, said header comprising: an indicator for indicating to said compliance mechanism that said media file originated from said server.

4. The method as recited in claim 1 further comprising utilizing said media player application to present contents of said media file, provided said media player application complies with said usage restriction.

5. The method as recited in claim 1 further comprising installing said compliance mechanism onto said computer system, said compliance mechanism configured to perform said detecting and said enabling.

6. The method as recited in claim 5 further comprising altering said compliance mechanism in response to changes in said usage restriction.

7. The method as recited in claim 6 further comprising installing a custom media player application on said computer system and configured to be operable when said media player application does not comply with said usage restriction.

8. The method as recited in claim 1 further comprising verifying the presence and the integrity of authorization data stored on said computer system, said verifying performed by said compliance mechanism prior to delivery of said media file to said computer system.

9. The method as recited in claim 1 further comprising encrypting said media file and a header attached therewith prior to delivery of said media file to said computer system.

10. The method as recited in claim 1 further comprising monitoring said media file during presentation of said contents for compliance with said usage restrictions, said monitoring performed by said compliance mechanism.

11. The method as recited in claim 1 wherein said media file is delivered via a hypertext transfer protocol file delivery.

12. The method as recited in claim 1 wherein said usage restriction is a copyright restriction or a licensing agreement applicable to said media file.

13. A computer readable medium for storing computer implementable instructions, said instructions for causing a compliance mechanism to perform a method of controlling interaction of a media file, said method comprising:
    discovering a media player application operable within a client computer system, said media player application for presenting contents of a media file deliverable to said client computer system; and
    utilizing a compliance mechanism to control an output of said media file by said media player, said compliance mechanism diverting a commonly used data pathway output of said media player application to a controlled data output pathway monitored by said compliance mechanism after said media player begins to present said contents of said media file, said compliance mechanism utilized to stop or disrupt the playing of said content of said media file at said controlled data output pathway when said playing of said content of said media file is outside of said usage restriction applicable to said media file.

14. The computer readable medium of claim 13 wherein said instructions cause said compliance mechanism to perform said method further comprising:
    initiating delivery of said media file to said client computer system from a server coupled with said client computer system.

15. The computer readable medium of claim 13 wherein said instructions cause said compliance mechanism to perform said method further comprising:
    detecting an indicator associated with said media file, said indicator for indicating said media file originated from said server.

16. The computer readable medium of claim 13 wherein said instructions cause said compliance mechanism to perform said method further comprising:
    utilizing said media player application to present said contents of said media file, provided said media player application complies with said usage restriction.

17. The computer readable medium of claim 16 wherein said instructions cause said compliance mechanism to perform said method further comprising:
    bypassing said media player application and invoking a custom media player application coupled with said client computer system when said media player application does not comply with usage restrictions applicable to said media file, said custom media player application for presenting contents of said media file in a manner compliant with said usage restriction.

18. The computer readable medium of claim 13 wherein said instructions cause said compliance mechanism to perform said method further comprising:

verifying the presence and integrity of authorization data stored on said client computer system.

19. The computer readable medium of claim 13 wherein said instructions cause said compliance mechanism to perform said method further comprising:
   initiating an installation of a newer version of said copyright compliance mechanism.

20. The computer readable medium of claim 13 wherein said instructions cause said compliance mechanism to perform said method further comprising:
   monitoring said media file for compliance with said usage restrictions during presentation of said contents.

21. The computer readable medium of claim 13 wherein said usage restriction is a copyright restriction or licensing agreement applicable to said media file.

22. The computer readable medium of claim 13 wherein said media file is delivered via a hypertext transfer protocol file delivery.

23. A system for media file usage restriction compliance comprising:
   a computer storage medium having instruction stored therein, said instructions when executed causing a computer system to perform media file usage restriction compliance, said instructions comprising:
   means for detecting a media player application operable on a client computer system and for presenting contents of a media file; and
   means for utilizing a compliance mechanism to control an output of said media file by said media player, said compliance mechanism diverting a commonly used data output pathway of said media player application to a controlled data output pathway monitored by said compliance mechanism after said media player begins to present said contents of said media file, said compliance mechanism utilized to stop or disrupt the playing of said content of said media file at said controlled data output pathway when said playing of said content of said media file is outside of said usage restriction applicable to said media file.

24. The system as recited in claim 23 further comprising:
   means for initiating delivery of said media file to said client computer system from a server coupled with said client computer system, said delivery via a hypertext transfer protocol file delivery.

25. The system as recited in claim 23 further comprising:
   means for utilizing said media player application to present said contents of said media file, when said media player application complies with said usage restriction.

26. The system as recited in claim 23 further comprising:
   means for deactivating said media player application when said media player application does not comply with said usage restriction.

27. The system as recited in claim 23 further comprising:
   means for activating a custom media player application coupled with said client computer system when said media player application is deactivated, said custom media player application for enabling said client computer system to comply with said usage restriction.

28. The system as recited in claim 23 further comprising:
   means for verifying the integrity of authorization data stored by said client computer system.

29. The system as recited in claim 23 further comprising:
   means for initiating installation of a newer version of said compliance mechanism.

30. The system as recited in claim 23 further comprising:
   means for detecting an indicator of a header associated with said media file, said indicator for indicating said media file originated from said server.

31. The system as recited in claim 23 further comprising:
   means for monitoring said media file for compliance with said usage restriction during presentation of said contents.

32. The system as recited in claim 23 wherein said usage restriction is a copyright restriction or a license agreement pertaining to said media file.

* * * * *

UNITED STATES PATENT AND TRADEMARK OFFICE
CERTIFICATE OF CORRECTION

PATENT NO. : 7,578,002 B2  
APPLICATION NO. : 10/304390  
DATED : August 18, 2009  
INVENTOR(S) : Risan et al.

Page 1 of 1

It is certified that error appears in the above-identified patent and that said Letters Patent is hereby corrected as shown below:

On the title page, item [73] Assignee should read:  
--Music Public Broadcasting, Inc. Santa Cruz, CA (US).--

Signed and Sealed this

Twentieth Day of April, 2010

David J. Kappos  
*Director of the United States Patent and Trademark Office*

UNITED STATES PATENT AND TRADEMARK OFFICE
CERTIFICATE OF CORRECTION

PATENT NO. : 7,578,002 B2  Page 1 of 1
APPLICATION NO. : 10/304390
DATED : August 18, 2009
INVENTOR(S) : Risan et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 591 days Delete the phrase "by 591 days" and insert -- by 876 days --

Signed and Sealed this

Twenty-seventh Day of April, 2010

David J. Kappos
*Director of the United States Patent and Trademark Office*